March 29, 1966   R. F. BRIDGE   3,242,776
MACHINING DEVICE
Filed Jan. 24, 1964
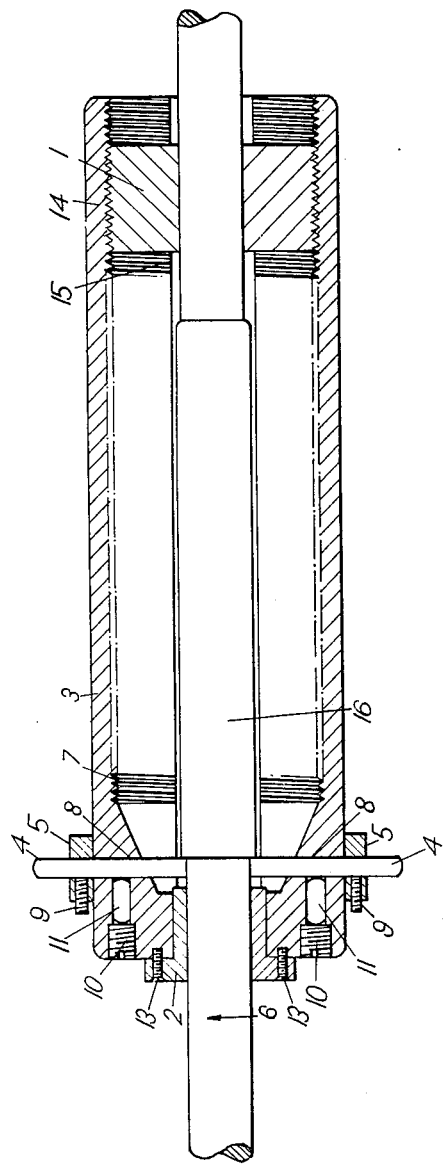
Inventor
RICHARD F. BRIDGE
By *Percy P. Lantz*
Attorney 3,242,776
MACHINING DEVICE
Richard F. Bridge, London, England, assignor to International Standard Electric Corporation, New York, N.Y., a corporation of Delaware
Filed Jan. 24, 1964, Ser. No. 339,936
Claims priority, application Great Britain, Feb. 1, 1963, 4,263/63
3 Claims. (Cl. 82—4)

This invention relates to machining devices and is particularly concerned with, although not limited to, machining devices for shaving the insulation of electric cables.

According to the present invention there is provided a machining device for machining a cylindrical surface such as the insulation of an electric cable which includes an externally threaded clamp to clamp the cylindrical surface coaxially with the thread, a tube internally threaded to mate with the thread on the clamp, cutting means protruding into the tube, and means to maintain the tube coaxial with the cylindrical surface so that upon rotation of the tube about the clamp the cutting means are traversed along and effect machining of the cylindrical surface.

In the accompanying drawing FIG. 1 is a longitudinal sectional view of a machining device being used for shaving the polythene insulation of a polythene insulated submarine cable.

The machiinng device consists of a tube 3 which is internally threaded, a pair of cutters 4 which pass through holes in the tube, a sliding collar 2, and an externally threaded clamp 1. The tube 3 has a slot 15 running along its length whereby the tube can be laterally applied to the cable. The collar 2 which is a sliding fit on the normal cable diameter is made in two parts and may be removed from the tube by releasing screws 13. This collar acts as a centering device for the tube 3. The penetration of the cutters 4 into the tube is determined by the position of collars 5 which are held on the cutters by means of screws 9. The cutters themselves are locked firmly in position by means of plungers 11 clamped by screws 10.

In the particular embodiment illustrated, a length of cable 6 is shown with an oversize portion 16 within the tube 3. The cable 6 is introduced into the tube by releasing collar 2 and passing the cable through the slot 15. The collar 2 is then replaced in order to centre the cable at one end of the tube. The cable is centered at the other end of the tube by means of the clamp 1, this clamp is split longitudinally and is first clamped on to the cable beyond the end of the tube. The length of cable is held taut and the tube 3 is then screwed on to the threaded clamp 1 so that the cutters are rotated and drawn along the length of the cable in order to reduce the oversize portion 16 to the correct diameter.

It is possible to set the depth of the cutters by inserting a standard gauge through the collar 2 before the cable is in position, and locking the collars 5 on to the cutters. The cutters may be released to allow the cable to be positioned and then replaced.

Instead of providing the tube 3 with the slot 15 the tube 3 may be made in two semi-circular parts which are located together about the cable 6 by dowel pins and clamped together by screws.

It is to be understod that the foregoing description of specific examples of this invention is not to be considered as a limitation on its scope.

What I claim is:
1. A device for machining the surface of a cylindrical member of indeterminate length, comprising:
   an internally threaded tube;
   an externally threaded first collar;
   a second collar coupled to said tube to co-axially align the device on said member;
   said tube and said first and second collars each being axially divided for transaxial assembly on said member; and
   cutting means, carried by said tube transverse to the axis of said tube to machine the surface of said member.
2. A device for machining the surface of a cylindrical workpiece of indeterminate length, comprising:
   a tube, internally threaded along a portion thereof but with one end unthreaded, having a slot formed in one side running the full length thereof to receive said workpiece;
   an externally threaded, clamping collar, said clamping collar being axially divided for transaxial assembly on said workpiece, the threads of said clamping collar mating with the threads of said tube;
   a sliding collar, removably positioned within the unthreaded end of said tube to coaxially align the device on said workpiece of indeterminate length, said sliding collar being axially divided for transaxial assembly on said workpiece; and
   cutting means, aligned between said sliding collar and said clamping collar, protruding into said tube, to machine the surface of said workpiece.
3. A device, according to claim 2, wherein:
   said tube is rotatable about said workpiece and movable axially to advance on said clamping collar and to rotate said cutters about and along the length of said workpiece to machine the surface thereof.

References Cited by the Examiner
UNITED STATES PATENTS

| | | | |
|---|---|---|---|
| 547,025 | 10/1895 | North | 82—4 |
| 1,109,387 | 9/1914 | Banta | 82—20 |
| 2,119,929 | 6/1938 | Schmidt | 82—4 |
| 2,308,671 | 1/1943 | Bowker | 82—4 |
| 2,309,218 | 1/1943 | Schwinn | 82—4 |
| 2,749,788 | 6/1956 | McMahon | 82—4 X |
| 3,112,663 | 12/1963 | Baird | 82—20 |

WILLIAM W. DYER, JR., *Primary Examiner.*
HARRISON L. HINSON, *Examiner.*